United States Patent
Li et al.

(10) Patent No.: US 9,430,878 B2
(45) Date of Patent: Aug. 30, 2016

(54) HEAD MOUNTED DISPLAY AND CONTROL METHOD THEREOF

(71) Applicant: Quanta Computer Inc., Tao Yuan Shien (TW)

(72) Inventors: Chung-Te Li, New Taipei (TW); Wen-Chu Yang, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 159 days.

(21) Appl. No.: 14/260,736

(22) Filed: Apr. 24, 2014

(65) Prior Publication Data

US 2015/0212330 A1    Jul. 30, 2015

(30) Foreign Application Priority Data

Jan. 24, 2014    (TW) .............................. 103102675 A

(51) Int. Cl.
| | |
|---|---|
| G06T 19/00 | (2011.01) |
| G02B 27/01 | (2006.01) |
| G02B 27/00 | (2006.01) |
| G06F 3/01 | (2006.01) |

(52) U.S. Cl.
CPC ......... *G06T 19/006* (2013.01); *G02B 27/0093* (2013.01); *G02B 27/0172* (2013.01); *G02B 27/0179* (2013.01); *G06F 3/01* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 2008/0002262 | A1* | 1/2008 | Chirieleison | ...... G02B 27/0093 359/630 |
| 2010/0214414 | A1* | 8/2010 | Spruck | ...................... A61F 4/00 348/158 |
| 2013/0038510 | A1* | 2/2013 | Brin | ...................... G02B 27/017 345/8 |
| 2013/0147686 | A1* | 6/2013 | Clavin | .................... G06F 3/013 345/8 |
| 2014/0191927 | A1* | 7/2014 | Cho | ...................... G02B 27/017 345/8 |

FOREIGN PATENT DOCUMENTS

| | | | | |
|---|---|---|---|---|
| CN | 102981616 A | * | 3/2013 | ............. G06F 3/013 |
| TW | 201303640 A | | 1/2013 | |

OTHER PUBLICATIONS

Taiwanese Office Action dated Jan. 8, 2015.

\* cited by examiner

*Primary Examiner* — Daniel Hajnik
(74) *Attorney, Agent, or Firm* — Rabin & Berdo, P.C.

(57) ABSTRACT

A head mounted display and a control method thereof are disclosed. The control method comprises following steps. An application processor controls a pico projector unit to project a virtual image having a virtual object located on a virtual image coordinate in a virtual image coordinate system. An eye image sensing unit captures an eye image data. A sensing apparatus senses a touch object to output a sensing data. An ASIC obtains a real image coordinate of the touch object in a real image coordinate system according to the sensing data. The ASIC obtains a pupil position according to the eye image data, and controls the adjustment unit to adjust an imaging position of the virtual image according to the pupil position. The ASIC determines whether the touch object touched the virtual object according to the pupil position, the real coordinate and the virtual coordinate.

22 Claims, 15 Drawing Sheets

HEAD MOUNTED DISPLAY AND CONTROL METHOD THEREOF

This application claims the benefit of Taiwan application Serial No. 103102675, filed Jan. 24, 2014, the subject matter of which is incorporated herein by reference.

BACKGROUND OF THE INVENTION

1. Field of the Invention

The invention relates in general to an electronic device, and more particularly to a head mounted display and a control method thereof.

2. Description of the Related Art

Along with the advance in technology, people assimilate more and more information every day. Commonly seen multimedia play apparatus, network communication apparatus and computer apparatus are equipped with a cathode ray tube (CRT) or a liquid crystal display (LCD) for displaying image. However, the pixels and size of a displayed image depend on the size and efficiency of the display. Conventional CRT or LCD cannot meet the requirements of large size and convenient portability at the same time. To resolve the above problem, an optical see-through head mounted display (HMD) apparatus is provided. The head mounted display apparatus has a CRT or LCD disposed in front of each eye. The head mounted display apparatus projects the images outputted by respective CRT or LCD onto the user's retinas through beam splitters and creates a 3D effect by using the parallax between the user's retinas.

In a conventional head mounted display (for example, Google glasses), the position of each beam splitter is fixed and cannot be adjusted. To view the image projected by the pico projector, the user has to adjust the viewing direction, not only resulting in inconvenience of use but also easily causing fatigue to the user's eyeballs.

SUMMARY OF THE INVENTION

The invention is directed to a head mounted display and a control method thereof.

According to one embodiment of the present invention, a head mounted display is provided. The head mounted display comprises a pico projector unit, an application processor, an eye image sensing unit, an adjustment unit, a sensing apparatus, an application specific integrated circuit (ASIC) and a glasses frame. The application processor controls a pico projector unit to project a virtual image having a virtual object located on a virtual image coordinate in a virtual image coordinate system. The eye image sensing unit captures an eye image data. The sensing apparatus senses a touch object to output a sensing data. The ASIC obtains a real image coordinate of the touch object in a real image coordinate system according to the sensing data. The ASIC obtains a pupil position according to the eye image data, and controls the adjustment unit to adjust an imaging position of the virtual image according to the pupil position. The ASIC determines whether the touch object touched the virtual object according to the pupil position, the real coordinate and the virtual coordinate. The glasses frame supports the adjustment unit, the pico projector unit, the application processor, the eye image sensing unit, the real coordinate capturing device and the ASIC.

According to another embodiment of the present invention, a control method of a head mounted display is provided. The control method of a head mounted display comprises: controlling a pico projector unit to project a virtual image having a virtual object located on a virtual image coordinate in a virtual image coordinate system; capturing an eye image data by the eye image sensing unit; sensing a touch object by a sensing apparatus to output a sensing data; obtaining a real image coordinate of the touch object in a real image coordinate system according to the sensing data; obtaining a pupil position according to the eye image data and controlling the adjustment unit to adjust an imaging position of the virtual image according to the pupil position; and determining whether the touch object touched the virtual object according to the pupil position, the real coordinate and the virtual coordinate.

The above and other aspects of the invention will become better understood with regard to the following detailed description of the preferred but non-limiting embodiment (s). The following description is made with reference to the accompanying drawings.

DETAILED DESCRIPTION OF THE INVENTION

First Embodiment

Figure 1:
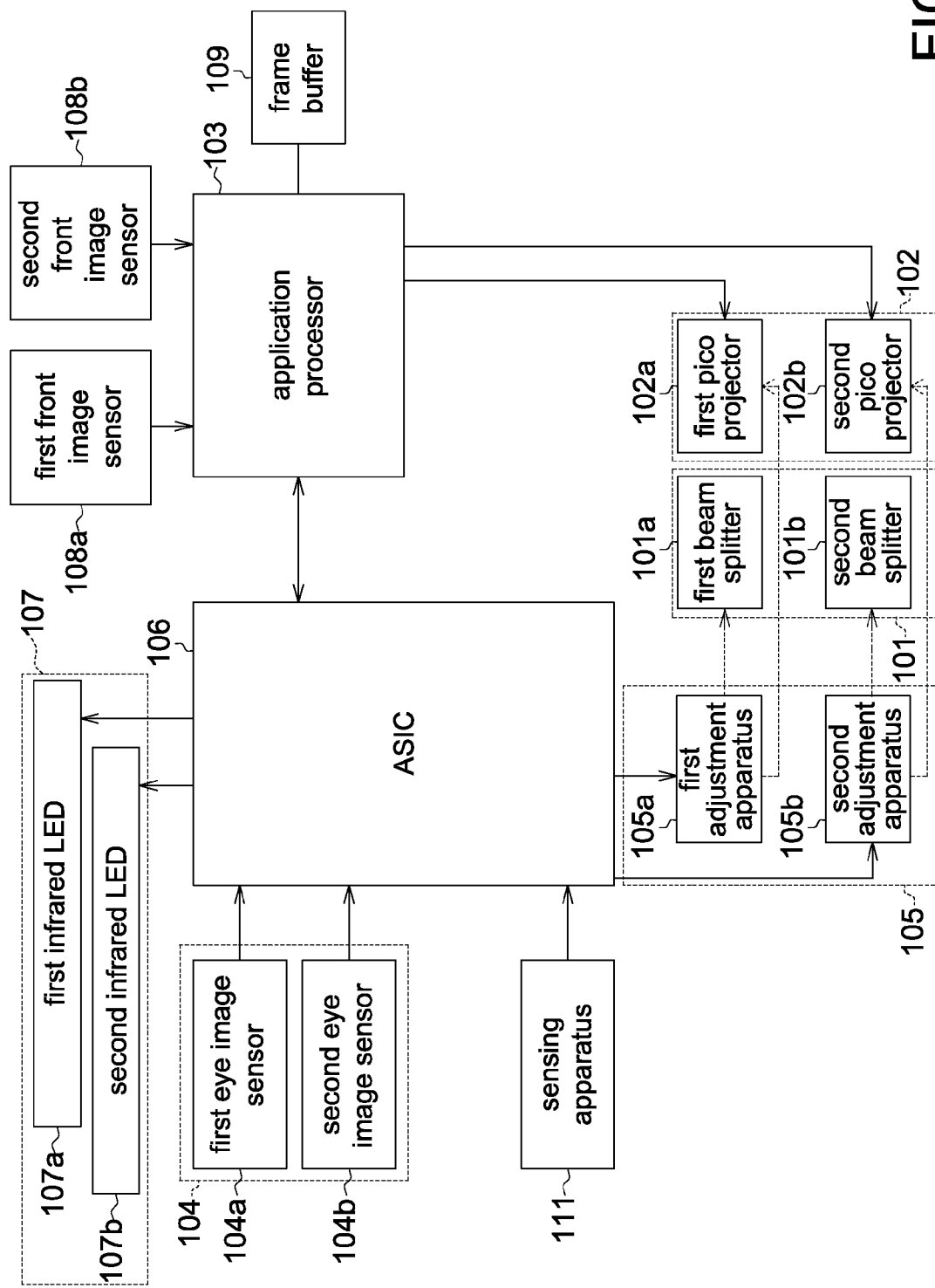
FIG. 1 is a block diagram of a head mounted display according to the first embodiment.
Figure 2:
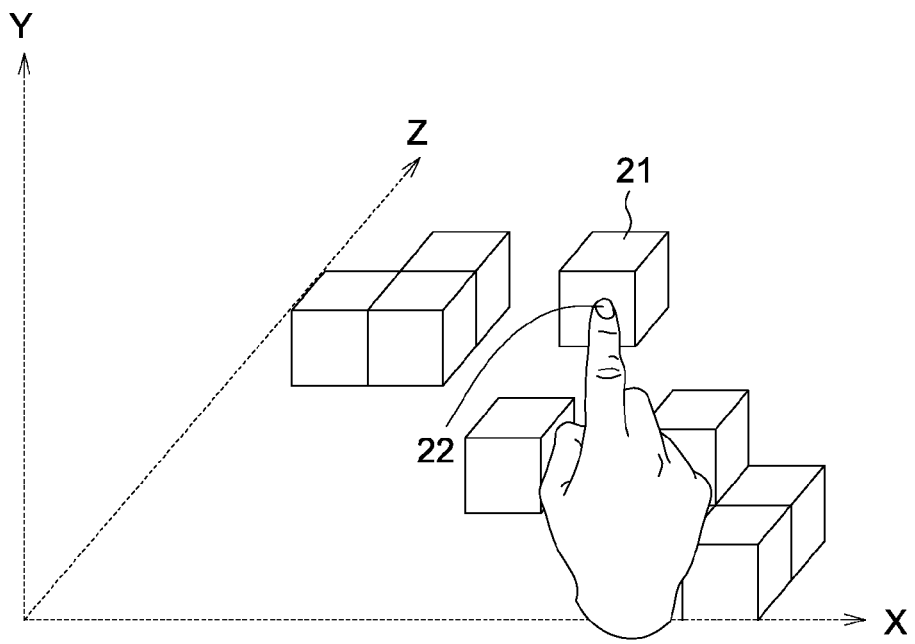
FIG. 2 is a schematic diagram of a virtual image and a touch object when the pupil position is located at the center of the eye.
Figure 3:
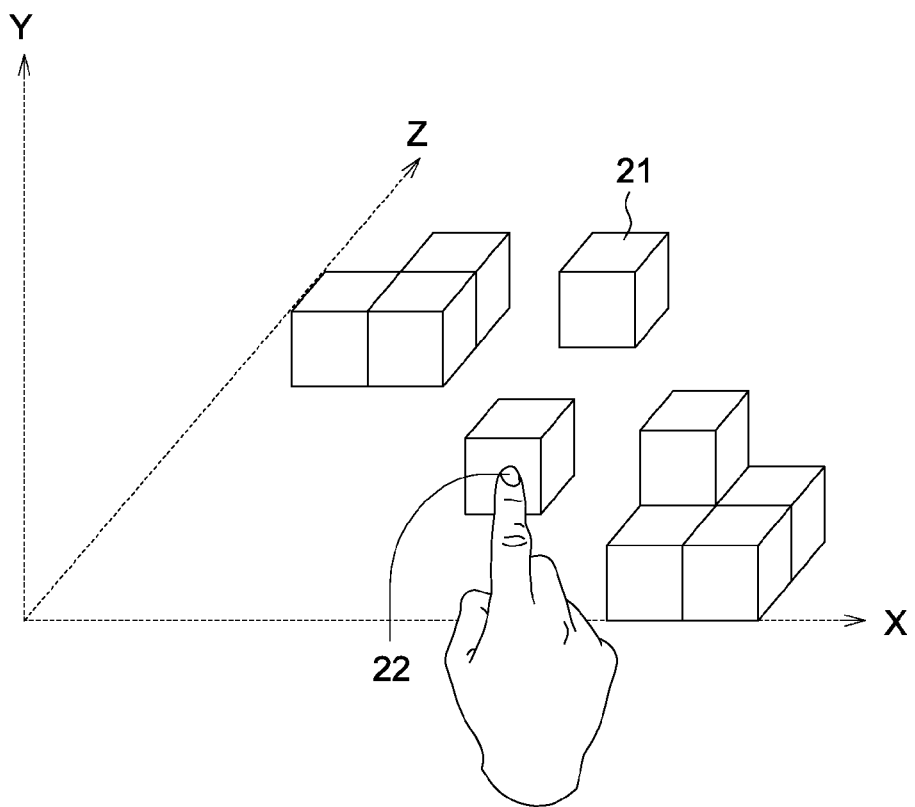
FIG. 3 is a schematic diagram of a virtual image and a touch object when a pupil position is not located at the center of an eye.

Refer to FIG. 1, FIG. 2 and FIG. 3. FIG. 1 is a block diagram of a head mounted display according to the first embodiment. FIG. 2 is a schematic diagram of a virtual image and a touch object when the pupil position is located at the center of the eye. FIG. 3 is a schematic diagram of a virtual image and a touch object when a pupil position is not located at the center of an eye. The head mounted display 1 comprises a beam splitter unit 101, a pico projector unit 102, an application processor 103, an eye image sensing unit 104, an adjustment unit 105, an application specific integrated circuit (ASIC) 106, an infrared light emitting unit 107, a first front image sensor 108a, a second front image sensor 108b, a frame buffer 109, a sensing apparatus 111 and a glasses frame. The glasses frame supports the beam splitter unit 101, the pico projector unit 102, the application processor 103, the eye image sensing unit 104, the adjustment unit 105, the ASIC 106, the infrared light emitting unit 107, the first front image sensor 108a, the second front image sensor 108b, the frame buffer 109 and the sensing apparatus 111. The frame buffer 109 stores the image data which will be projected by the pico projector unit 102. The infrared light emitting unit 107 provides an auxiliary light source required by the eye image sensing unit 104.

The ASIC 106 communicates with the application processor 103 through a universal serial bus (USB). The first front image sensor 108a and the second front image sensor 108b are connected to the application processor 103, and communicate with the application processor 103 through a mobile industry processor interface (MIPI). The eye image sensing unit 104 is connected to the ASIC 106, and communicates with the ASIC 106 through a parallel interface (parallel I/F) or an MIPI. The infrared light emitting unit 107 is connected to the ASIC 106, and communicates with the ASIC 106 through a general purpose input output (GPIO). The infrared light emitting unit 107 is controlled by the ASIC 106 to provide an auxiliary light source required by the eye image sensing unit 104.

The control method of a head mounted display 1 comprises following steps. The application processor 103 controls the pico projector unit 102 to project a virtual image 2. The virtual image comprises a virtual object 21 which is a 3D image located on a virtual image coordinate in a virtual image coordinate system. The eye image sensing unit 104 captures a user's eye image data. The eye image data, for example, comprises one or a plurality of eyeball images. The sensing apparatus 111 senses a touch object 22 to output a sensing data. The touch object 22 can be realized by such as the user's finger or palm. The ASIC 106 obtains a real coordinate of the touch object 22 in a real image coordinate system according to the sensing data. The ASIC 106 obtains a user's pupil position according to the eye image data, and controls the adjustment unit 105 to suitably adjust an imaging position of the virtual image according to the pupil position. That is, the ASIC 106 controls the adjustment unit 105 to change the position of the eyes to which the beam of a virtual image is projected according to the pupil position. The ASIC 106 determines whether the touch object 22 touched the virtual object 21 according to the pupil position, the real coordinate and the virtual coordinate.

Figure 11:
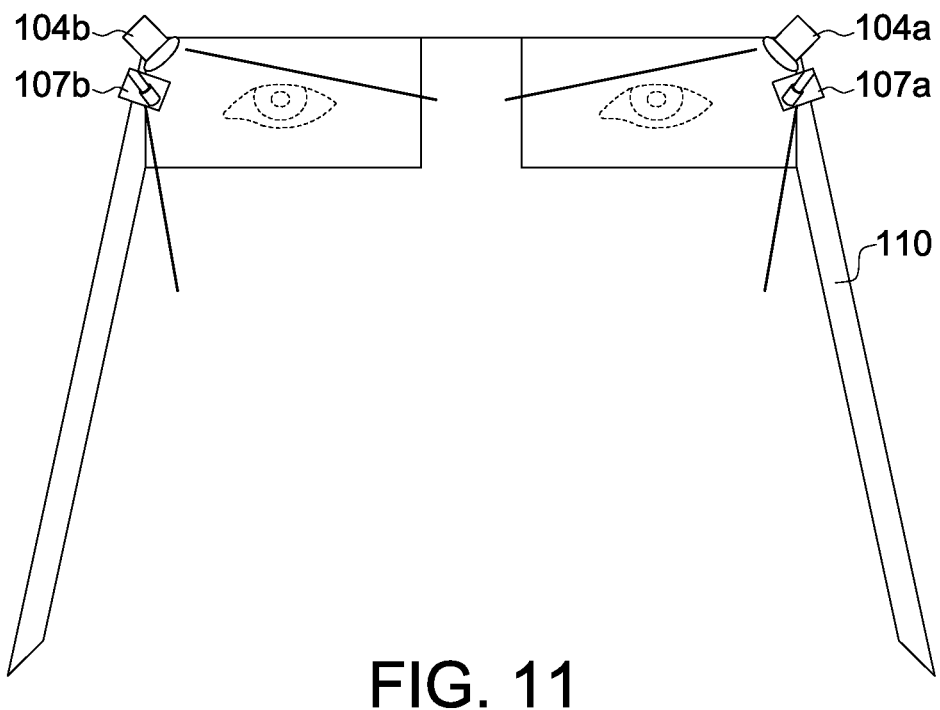
FIG. 11 is a first schematic diagram of a first eye image sensor, a second eye image sensor, a first infrared LED and a second infrared LED disposed on a glasses frame.
Figure 12:
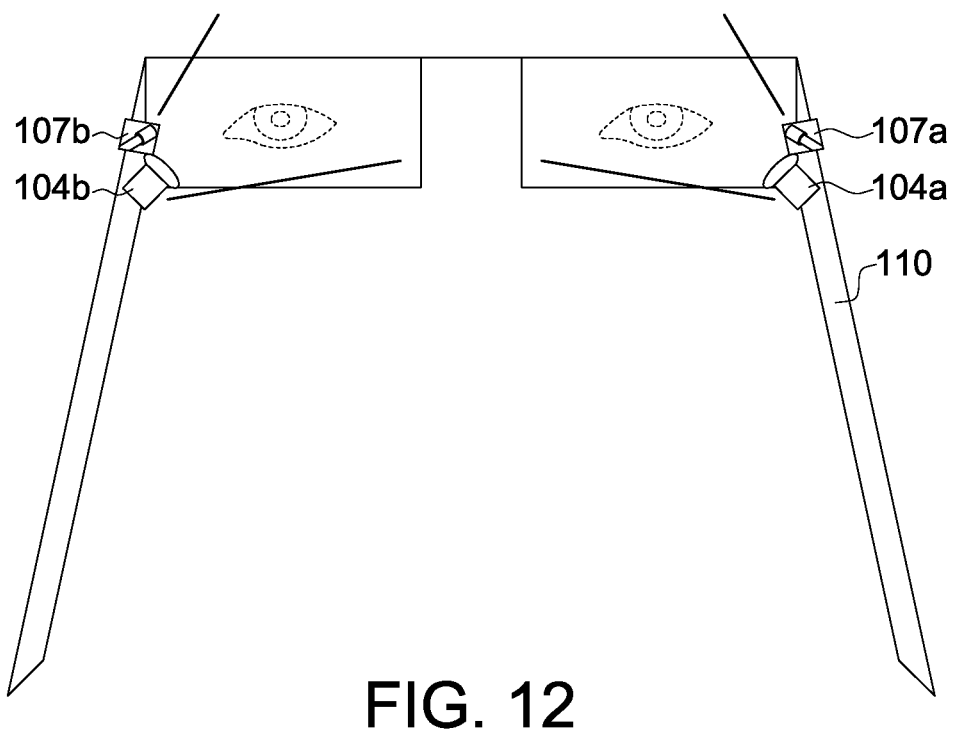
FIG. 12 is a second schematic diagram of a first eye image sensor, a second eye image sensor, a first infrared LED and a second infrared LED disposed on a glasses frame.

Refer to FIG. 1, FIG. 11 and FIG. 12 at the same time. FIG. 11 is a first schematic diagram of a first eye image sensor, a second eye image sensor, a first infrared LED and a second infrared LED disposed on a glasses frame. FIG. 12 is a second schematic diagram of a first eye image sensor, a second eye image sensor, a first infrared LED and a second infrared LED disposed on a glasses frame. The eye image sensing unit 104 may comprise one or a plurality of eye image sensors. In the first embodiment, the eye image sensing unit 104 exemplarily comprises a first eye image sensor 104a and a second eye image sensor 104b. The first eye image sensor 104a and the second eye image sensor 104b capture an eye image data. In the first embodiment, the eye image data exemplarily comprises a left-eye image and a right-eye image. The ASIC 106 detects the pupil position of two eyes according to the left-eye image and the right-eye image. The infrared light emitting unit 107 may comprise one or a plurality of infrared LEDs. In the first embodiment, the infrared light emitting unit 107 exemplarily comprises a first infrared LED 107a and a second infrared LED 107b. The first eye image sensor 104a, the second eye image sensor 104b, the first infrared LED 107a and the second infrared LED 107b can be disposed on the glasses frame 110 as indicated in FIG. 11. In addition, the first eye image sensor 104a, the second eye image sensor 104b, the first infrared LED 107a and the second infrared LED 107b can be disposed on the glasses frame 110 as indicated in FIG. 12. When the ambient light source is too dark, the ASIC 106 activates the first infrared LED 107a to provide an auxiliary light source required by the first eye image sensor 104a. The ASIC 106 further activates the second infrared LED 107b to provide an auxiliary light source required by the second eye image sensor 104b. Thus, the image quality of the image captured by the first eye image sensor 104a and the second eye image sensor 104b can be improved.

Figure 18:
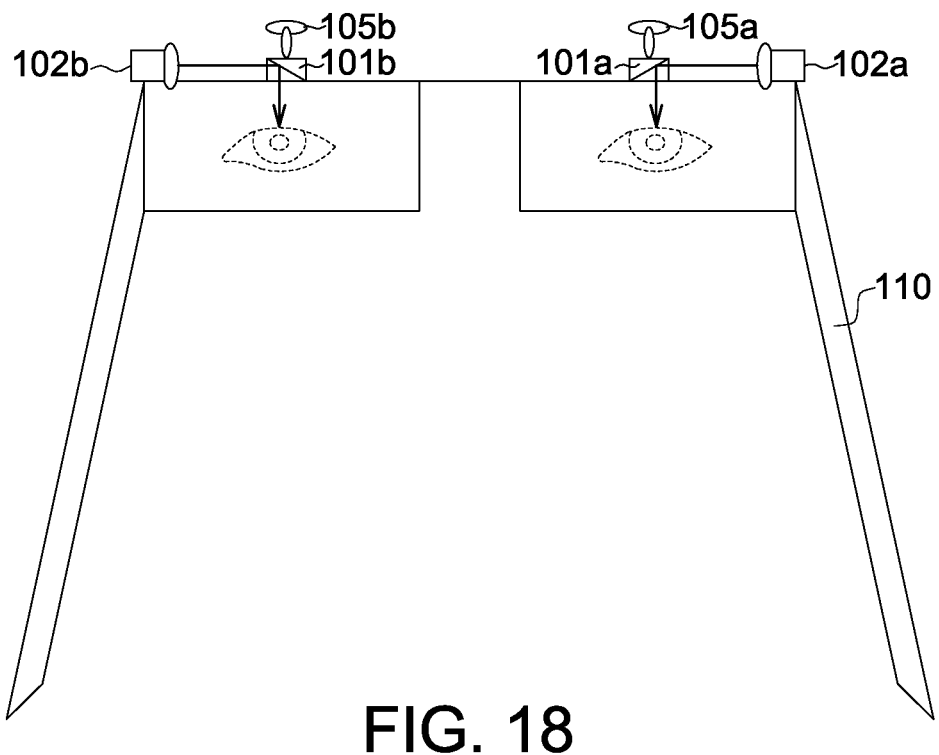
FIG. 18 is a schematic diagram of adjustment units adjusting beam splitter units.
Figure 19:
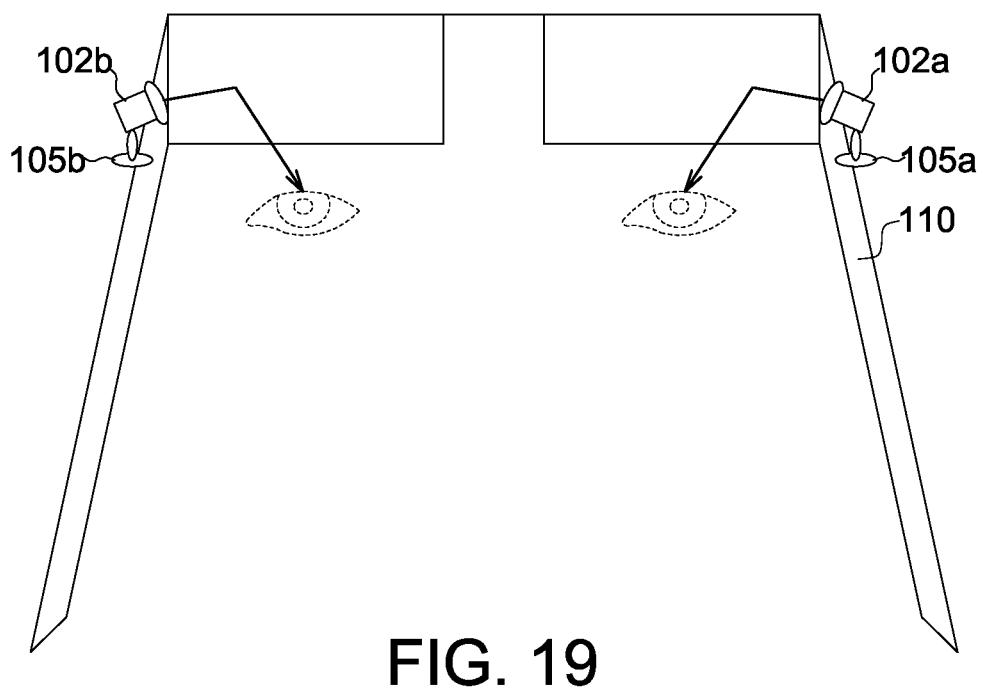
FIG. 19 is a schematic diagram of adjustment units adjusting pico projector units.

Refer to FIG. 1, FIG. 18 and FIG. 19 at the same time. FIG. 18 is a schematic diagram of adjustment units adjusting beam splitter units. FIG. 19 is a schematic diagram of adjustment units adjusting pico projector units. The beam splitter unit 101 comprises may comprise one or a plurality of beam splitter. In the first embodiment, the beam splitter unit 101 exemplarily comprises a first beam splitter 101a and a second beam splitter 101b. Similarly, the pico projector unit 102 may comprise one or a plurality of the pico projectors. In the first embodiment, the pico projector unit 102 exemplarily comprises a first pico projector 102a and a second pico projector 102b. The first pico projector 102a and the second pico projector 102b project a virtual image. The adjustment unit 105 may comprise one or a plurality of adjustment apparatuses. In the first embodiment, the adjustment unit 105 exemplarily comprises a first adjustment apparatus 105a and a second adjustment apparatus 105b. The first adjustment apparatus 105a and the second adjustment apparatus 105b can be realized by such as pan-tilt-zoom (PTZ) actuators, motor-driven actuators, direct current motors, springs, sliding tracks, and so on. The motor driver can be realized by such as stepper motor, corresponding gear set, motor driver IC, and so on.

The adjustment unit 105 can adjust an imaging position of the virtual image by adjusting the beam splitter unit 101 or the pico projector unit 102. For instance, the adjustment unit 105 can adjust an imaging position of the virtual image by adjusting the beam splitter unit 101 as indicated in FIG. 18. The ASIC 106 controls the first adjustment apparatus 105a and the second adjustment apparatus 105b to suitably adjust the first beam splitter 101a and the second beam splitter 101b according to the user's pupil position to respectively project the virtual image projected by the first pico projector 102a and the second pico projector 102b to the user's pupil position.

Or, the adjustment unit 105 can adjust an imaging position of the virtual image by adjusting the pico projector unit 102 as indicated in FIG. 19. When the first adjustment apparatus 105a and the second adjustment apparatus 105b are realized by PTZ actuators, the first adjustment apparatus 105a and the second adjustment apparatus 105b can control the first pico projector 102a and the second pico projector 102b to rotate horizontally, move vertically or scale an image. The ASIC 106 controls the first adjustment apparatus 105a and the second adjustment apparatus 105b to suitably adjust the first pico projector 102a and the second pico projector 102b according to the user's pupil position to respectively project the virtual image projected by the first pico projector 102a and the second pico projector 102b to the user's pupil position.

When the user's pupil position is located at the center of the eye, the ASIC 106 converts a real coordinate into a first relative coordinate in the virtual coordinate system, and determines whether the first relative coordinate matches the virtual image coordinate. If the first relative coordinate matches the virtual image coordinate, then the ASIC 106 determines that the touch object 22 touched the virtual object 21 (as indicated in FIG. 2). Conversely, when the pupil position is not located at the center of the eye, the ASIC 106 keeps the virtual coordinate unchanged, and correspondingly converts a real coordinate into a second relative coordinate, which differs with the first relative coordinate by a touch displacement, in the virtual coordinate system.

Since the ASIC 106 controls the adjustment unit 105 to suitably adjust an imaging position of the virtual image according to the pupil position, the virtual image projected by the pico projector unit 102 will definitely be projected to the user's pupil position no matter how the pupil position would change. In other words, the virtual coordinate of the virtual object 21 viewed by the user will not change no matter how the pupil position would change. For instance, both the real image coordinate system and the virtual image coordinate system use the center of vision as the original point. When the user's pupil position moves rightward from the center of the eye, in theory, the virtual object 21 should correspondingly move leftward. Since the ASIC 106 controls the adjustment unit 105 to suitably adjust an imaging position of the virtual image according to the pupil position, the virtual coordinate of the virtual object 21 will not change correspondingly.

With respect to the earth coordinate system, the original point of the real image coordinate system and that of the virtual image coordinate system actually have moved leftward. That is, the touch object 22 touches the virtual object 21 when the user's pupil position is located at the center of the eye (as indicated in FIG. 2). When the user's pupil position moves rightward from the center of the eye, the virtual object 21 moves along with the pupil position. Meanwhile, if the touch object 22 does not move together, the touch object 22 can no longer touch the virtual object 21 (as indicated in FIG. 3). Therefore, when the pupil position is not located at the center of the eye, the ASIC 106 keeps the virtual coordinate of the virtual object 21 unchanged, and correspondingly converts the real coordinate of the touch object 22 to a second relative coordinate which differs with the first relative coordinate by a touch displacement. That is, the touch object 22 needs to correspondingly move for the disclosed touch displacement in order to touch the virtual object 21 again. Thus, the ASIC 106 determines that the second relative coordinate matches the virtual image coordinate. If the second relative coordinate matches the virtual image coordinate, the ASIC 106 determines that the touch object 22 touched the virtual object 21.

Figure 4:
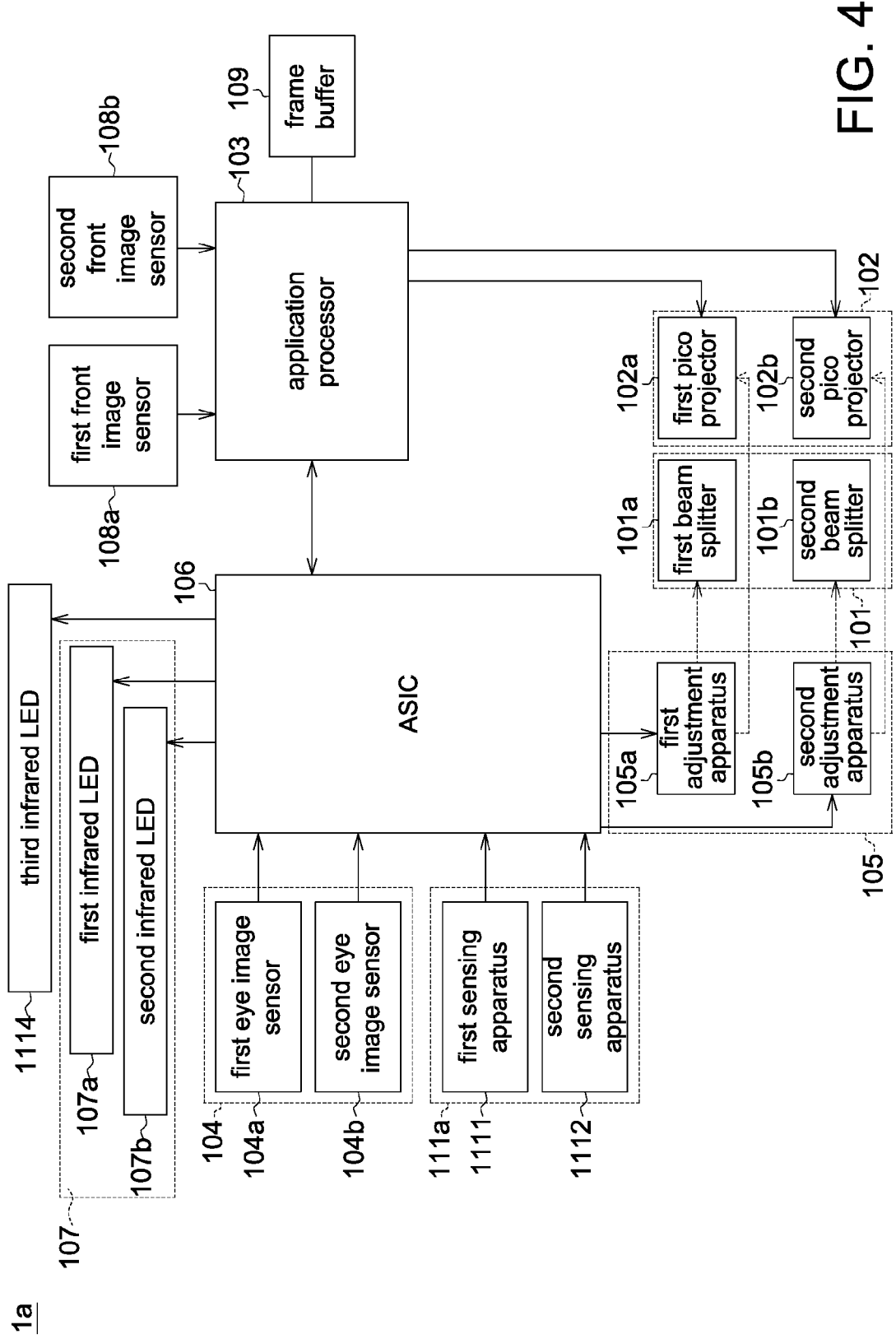
FIG. 4 is a block diagram of a head mounted display with a sensing apparatus being a first image sensor and a second image sensor.
Figure 5:
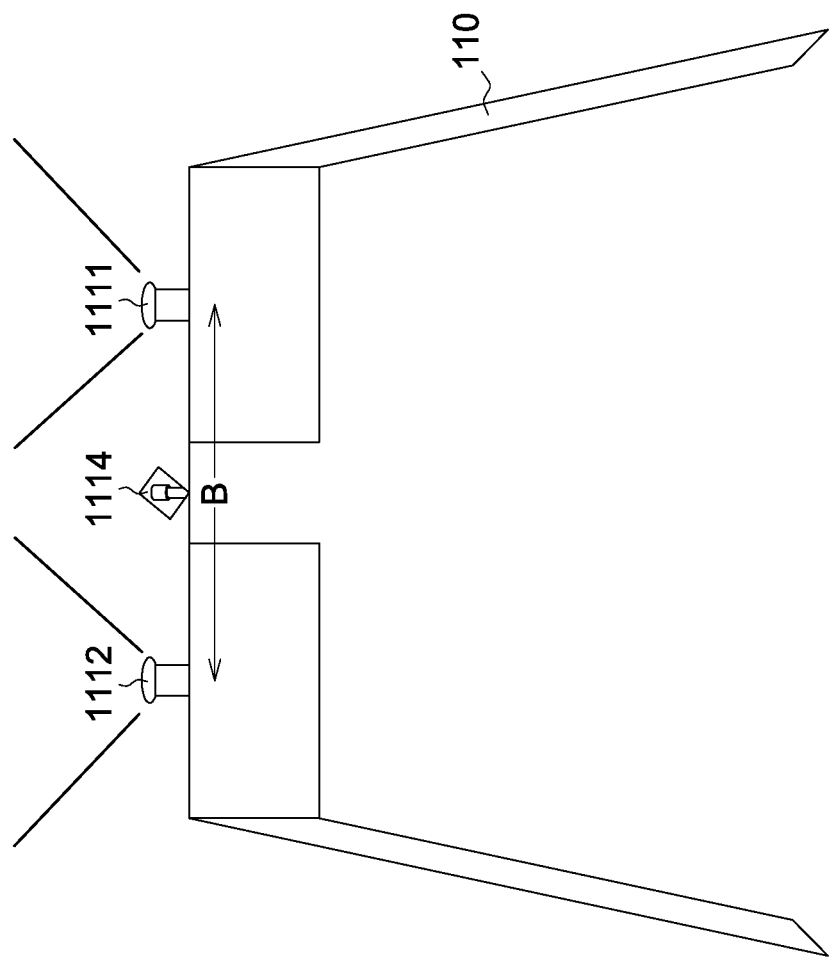
FIG. 5 is a schematic diagram of a third infrared LED, a first image sensor and a second image sensor disposed on a glasses frame.

Refer to FIG. 4 and FIG. 5 at the same time. FIG. 4 is a block diagram of a head mounted display with a sensing apparatus being a first image sensor and a second image sensor. FIG. 5 is a schematic diagram of a third infrared LED, a first image sensor and a second image sensor disposed on a glasses frame. In FIG. 4, the head mounted display is exemplified by a head mounted display 1a, and the sensing apparatus is exemplified by a sensing apparatus 111a comprising a first image sensor 1111 and a second image sensor 1112. The first image sensor 1111 and the second image sensor 1112 capture the user's view angle image. In the first embodiment, the depth value of the touch object is obtained by using stereo matching technology. According to the stereo matching technology, the first image sensor 1111 and the second image sensor 1112 are used to simulate the user's two eyes, and a depth value of the touch object is obtained from the image captured by the first image sensor 1111 and the second image sensor 1112. The ASIC 106 can obtain a planar coordinate of the touch object according to the image captured by the first image sensor 1111 or the second image sensor 1112. A 3D coordinate of the touch object can be obtained and used as a real image coordinate according to the planar coordinate of the touch object and the depth value.

Besides, an optical spacing B between the first image sensor 1111 and the second image sensor 1112 can be suitably adjusted according to the differences in the depth of real image in practical implementation. For instance, a smaller optical spacing B can be used in an implementation with a smaller depth value. Conversely, a larger can be used in an implementation with a larger depth value. When the ambient light source is too dark, the ASIC 106 can activate the third infrared LED 1114 to provide an auxiliary light source to increase the image quality of the image captured by the first image sensor 1111 and the second image sensor 1112. For convenience of description, the third infrared LED 1114 collaborates with the first image sensor 1111 and the second image sensor 1112 as indicated in FIG. 5.

Figure 13:
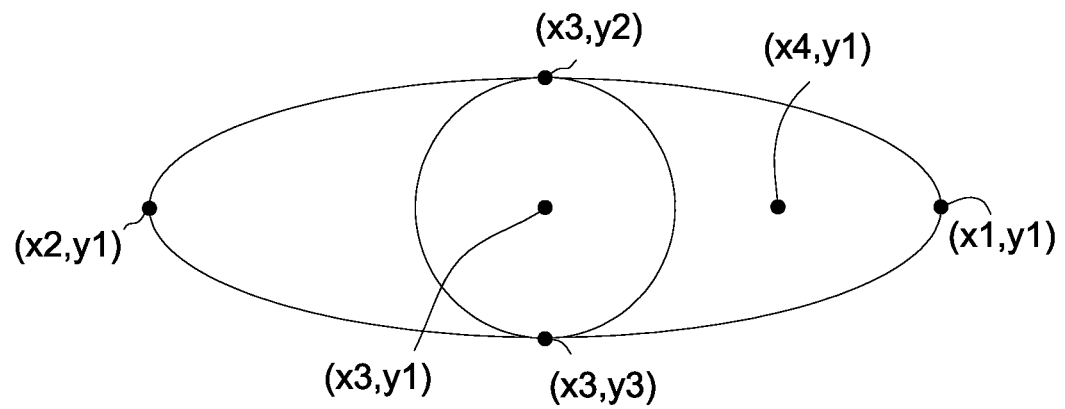
FIG. 13 is a schematic diagram of a user eye.
Figure 14:
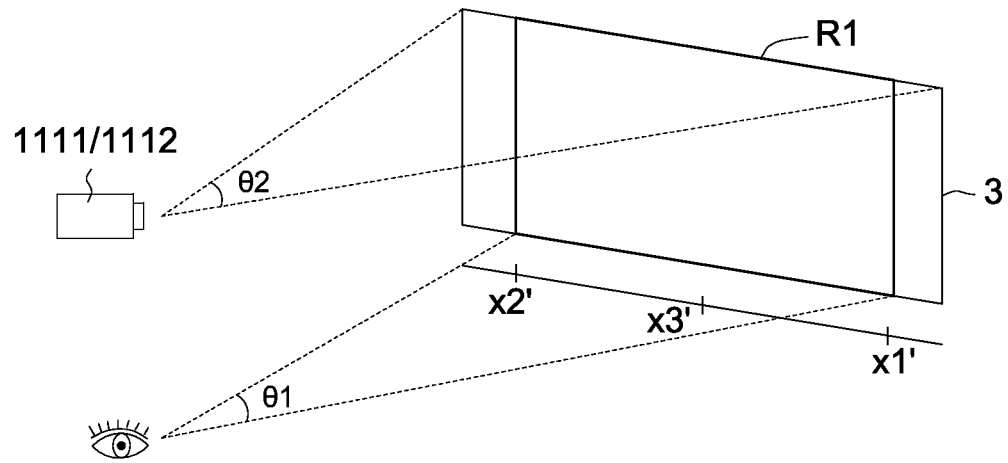
FIG. 14 is a schematic diagram of a maximum ROI on a wide angle image.

Refer to FIG. 4, FIG. 13 and FIG. 14 at the same time. FIG. 13 is a schematic diagram of a user eye. FIG. 14 is a schematic diagram of a maximum ROI on a wide angle image. Furthermore, the head mounted display 1a can perform calibration according to the user's physiological situations. For instance, suppose the user's head does not move, the pupil moving from the leftmost pupil position to the rightmost pupil position can cover a view angle of about 180 degrees. Suppose the user's two eyes have the same size. Since people's abilities in controlling eyeball muscles are different, the leftmost pupil position and the rightmost pupil position depend on people's individual situations. Through initial align calibration, the head mounted display 1a can be adapted to fit people's physiological differences. The first image sensor 1111 or the second image sensor 1112 each comprises a wide angle lens for capturing wide angle image. The elaboration below is exemplified by wide angle image. However, in practical implementation, the wide angle lens calibration can be performed on a wide angle image first, and then the initial align calibration is subsequently performed on the wide angle calibrated wide angle image.

When a horizontal view angle $\theta 2$ of the first image sensor 1111 or the second image sensor 1112 is equal to 180 degrees, the first image sensor 1111 or the second image sensor 1112 correspondingly captures a wide angle image 3. Suppose a maximum horizontal view angle $\theta 1$ corresponding to the user's pupil position moving from the leftmost position to the rightmost position is equal to 160 degrees, the user's maximum region of interest (maximum ROI) R1 in the wide angle image 3 is as indicated in FIG. 14.

The process of initial align calibration comprises following steps. Firstly, the application processor 103 notifies the user to look straight ahead. Next, the application processor 103 notifies the user to move his/her pupil position to the leftmost position, and records the leftmost pupil position (x2,y1). Meanwhile, the horizontal position x2 of the pupil position corresponds to the horizontal position x2' of the wide angle image 3. Then, the application processor 103 notifies the user to move his/her pupil position to the rightmost position, and records the rightmost pupil position (x1,y1). Meanwhile, the horizontal position x1 of the pupil position corresponds to the horizontal position x1' of the wide angle image 3. Thus, the head mounted display 1a can obtain the pupil position corresponding to the maximum horizontal view angle, and obtain the correspondence relationship between the horizontal position x2 and the horizontal position x2' and the correspondence relationship between the horizontal position x1 and horizontal position x1'. The horizontal position of the maximum ROI R1 will fall between the horizontal position x2' and the horizontal position x1'. The horizontal positions x2' and x1' are horizontal boundary positions of the maximum ROI R1. The head mounted display 1a can subsequently perform an adjustment process according to the correspondence relationship between the horizontal position x2 and the horizontal position x2' and the correspondence relationship between the horizontal position x1 and the horizontal position x1'. Similarly, the head mounted display 1a can obtain the pupil position corresponding to the maximum vertical view angle and the corresponding vertical boundary. The head mounted display 1a can subsequently perform an adjustment process according to the correspondence relationship between the vertical positions y2 and y3 and the boundary position.

Figure 15:
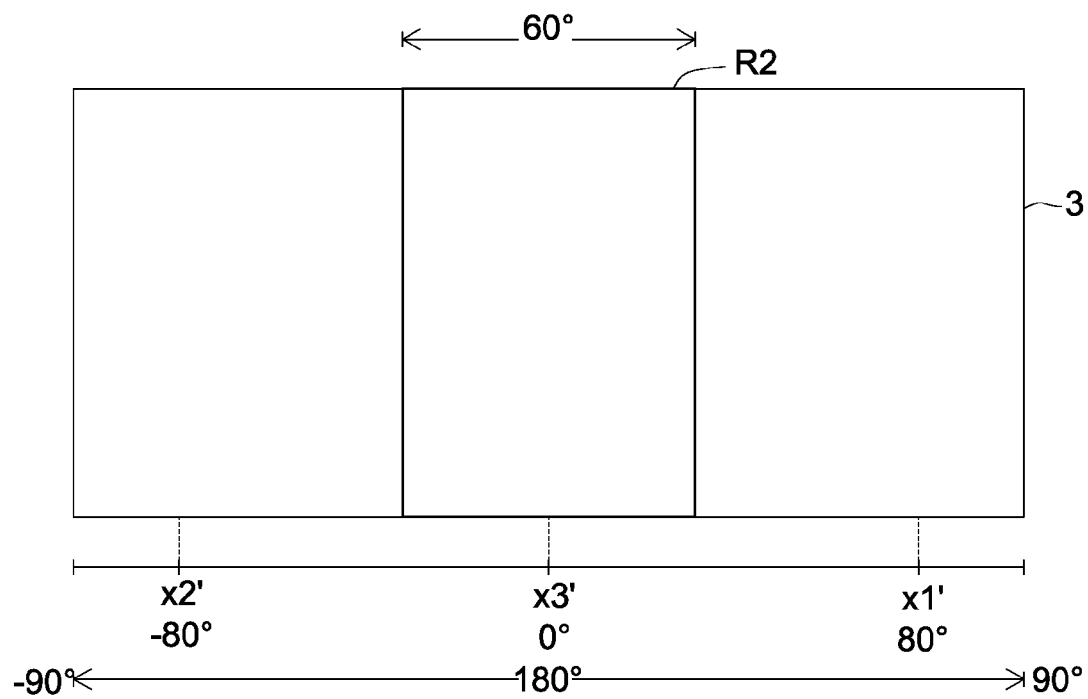
FIG. 15 is a schematic diagram of an ROI when a pupil is located at the center.
Figure 16:
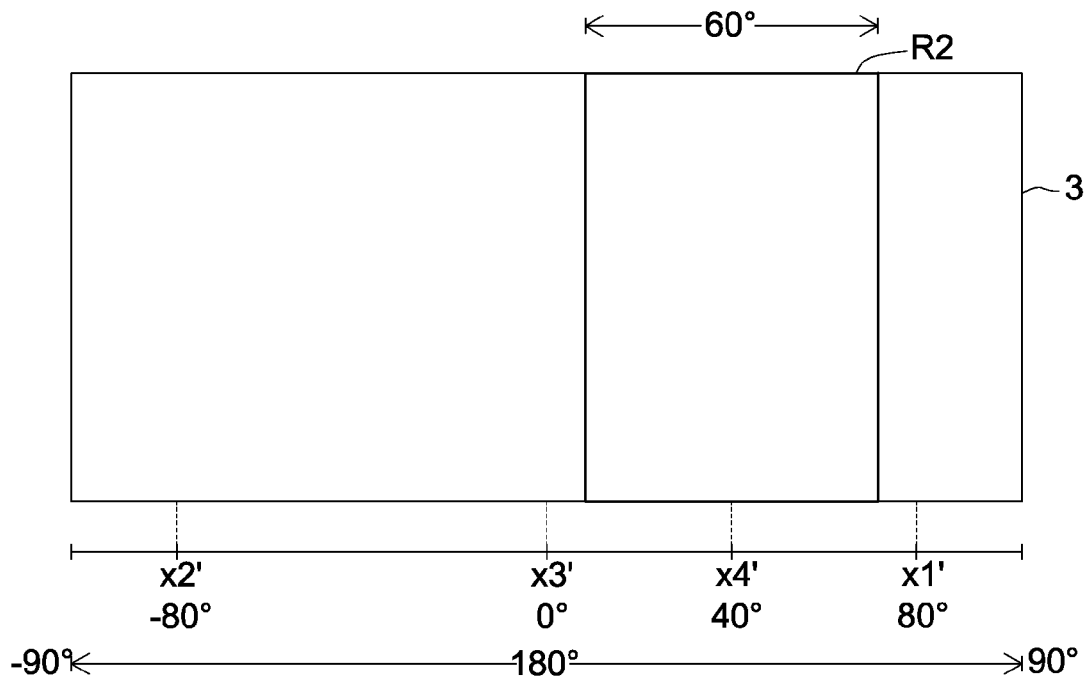
FIG. 16 is a schematic diagram of an ROI after a pupil is moved rightward from the center.

Refer to FIG. 1, FIG. 13, FIG. 15 and FIG. 16 at the same time. FIG. 15 is a schematic diagram of an ROI when a pupil is located at the center. FIG. 16 is a schematic diagram of an ROI after a pupil is moved rightward from the center. Suppose the user's horizontal view angle is equal to 60 degrees, and the user's pupil is located at the center, that is, the pupil position is (x3,y1). The horizontal position x3 corresponds to the horizontal position x3' at the center of the ROI R2 as indicated in FIG. 15. After the pupil moved rightward from the center, the pupil position (x3,y1) changes to the pupil position (x4,y1), wherein the horizontal position x4=(x1+x3)/2. The horizontal position x4 corresponds to the horizontal position x4' at the center of the ROI R2 as indicated in FIG. 16. For convenience of elaboration, the disclosed implementation is exemplarily elaborated with linear correspondence but is not limited thereto. After the head mounted display 1a obtains horizontal positions x2' and x1', the user can move the ROI R2 between the horizontal position x2' and the horizontal position x1'. The head mounted display 1a correspondingly records the correspondence relationship between the pupil position and the horizontal position at the center of each ROI R2, and further establishes a reference data table. In subsequent process, the head mounted display 1a can determine the position of the ROI R2 by looking up the table.

The above elaboration provides a basis for calculating how much the real coordinate will be displaced when the pupil moves horizontally, that is, a method for calculating the touch displacement. When the pupil moves, the ROI R2 will change to a new position which is the second relative coordinate. The implementation of the pupil's vertical movement is similar to the implementation of the pupil's horizontal movement disclosed above.

Second Embodiment

Figure 6:
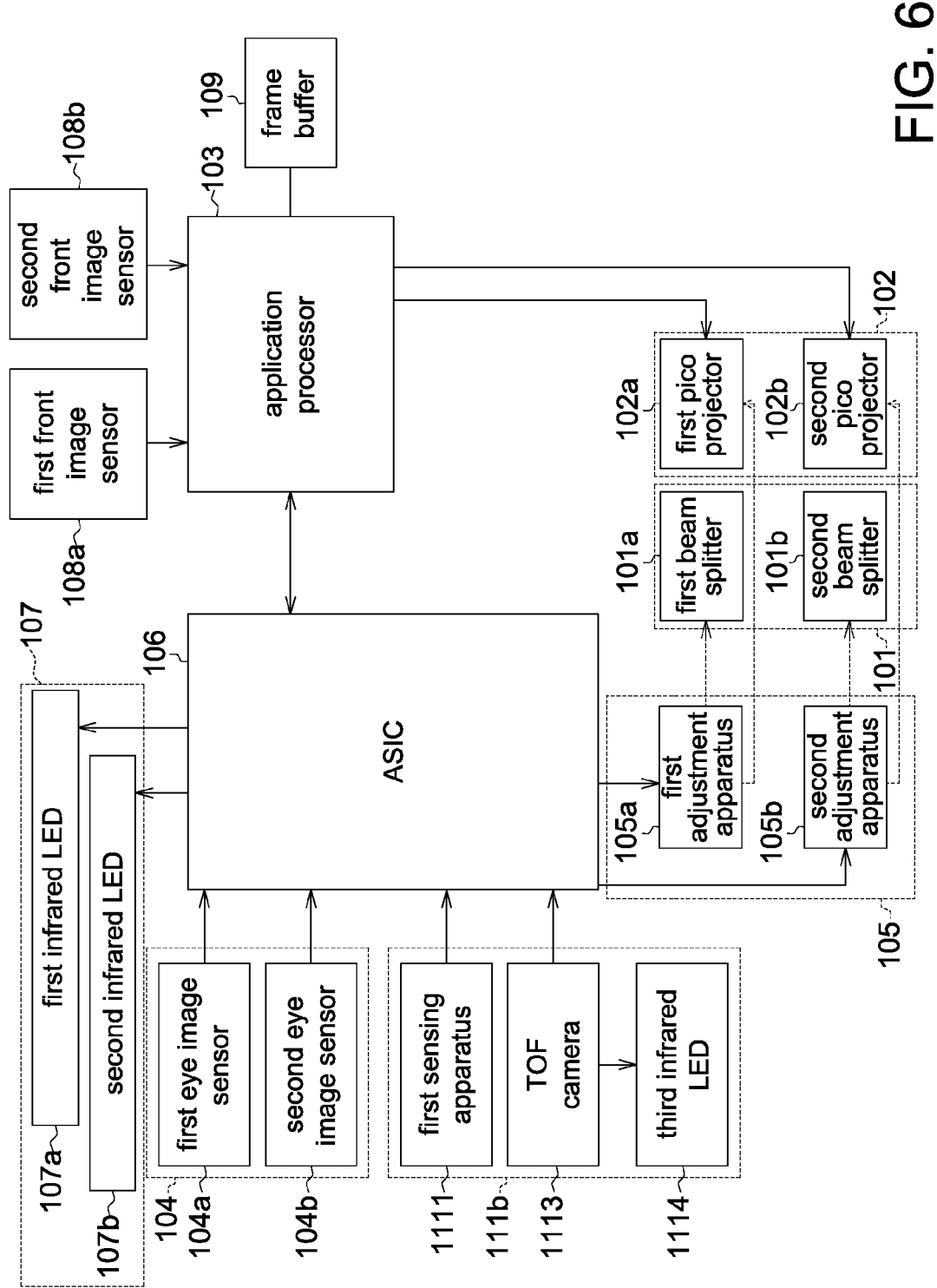
FIG. 6 is a block diagram of a head mounted display according to a second embodiment.
Figure 7:
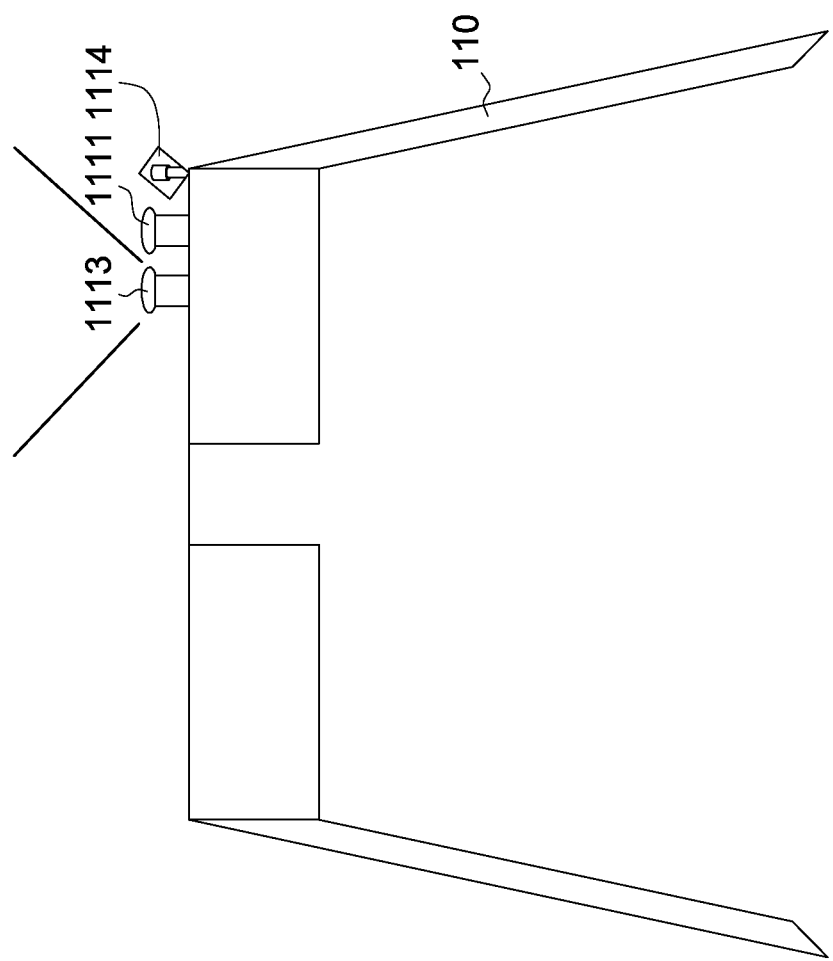
FIG. 7 is an appearance diagram of a head mounted display according to a second embodiment.

Refer to FIG. 6 and FIG. 7 at the same time. FIG. 6 is a block diagram of a head mounted display according to a second embodiment. FIG. 7 is an appearance diagram of a head mounted display according to a second embodiment. The second embodiment is different from the first embodiment mainly in that the head mounted display of FIG. 6 is exemplified by a head mounted display 1b, and the sensing apparatus is exemplified by a sensing apparatus 111b comprising a first image sensor 1111, a time of flight (TOF) camera 1113 and a third infrared LED 1114. The TOF camera 1113 collaborates with the third infrared LED 1114 to obtain a depth value of the touch object. The ASIC 106 can obtain a planar coordinate of the touch object according to the image captured by the first image sensor 1111. A 3D coordinate of the touch object can be obtained and used as a real image coordinate according to the planar coordinate of the touch object and the depth value.

Third Embodiment

Figure 8:
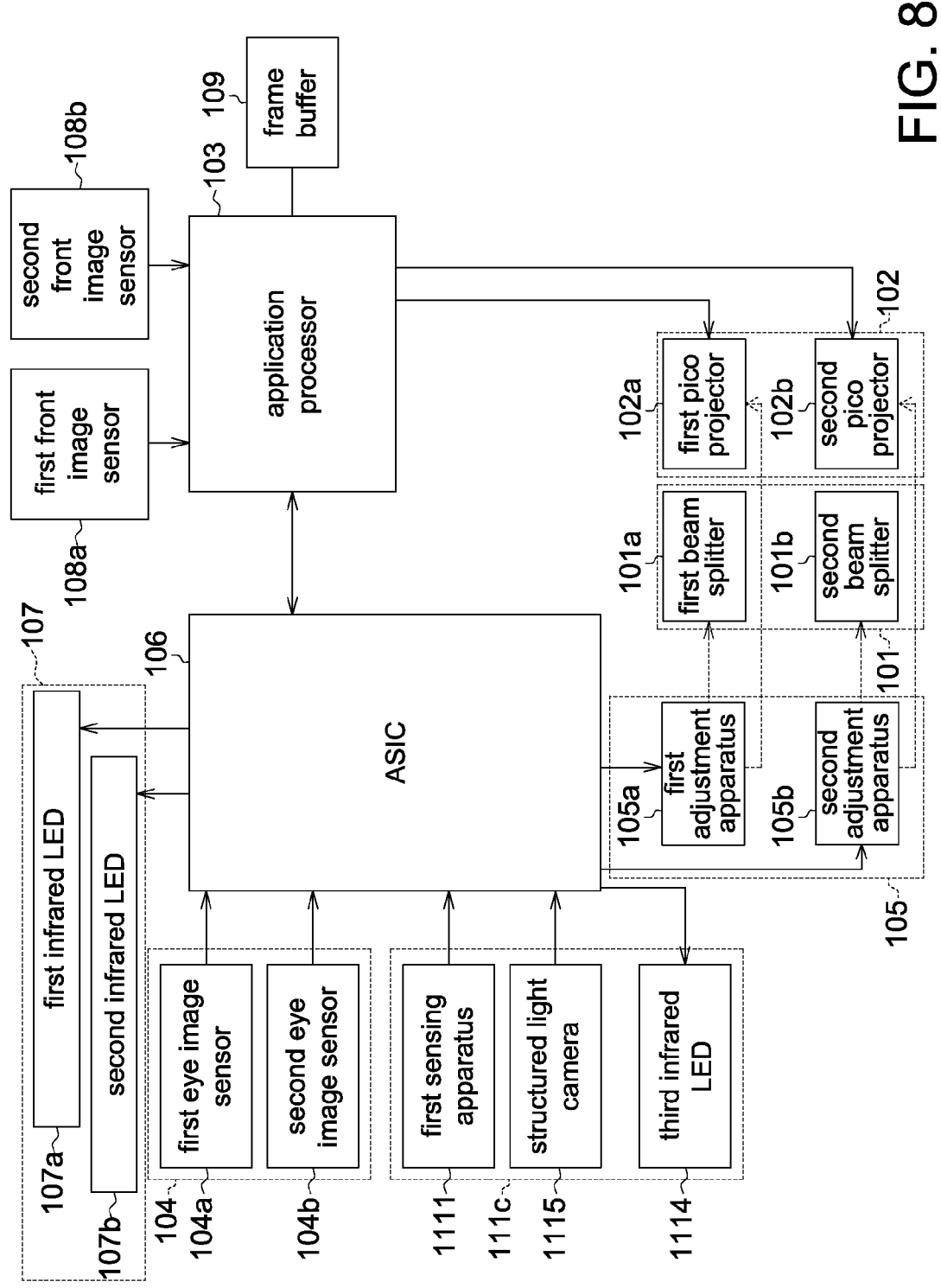
FIG. 8 is a block diagram of a head mounted display according to a third embodiment.
Figure 9:
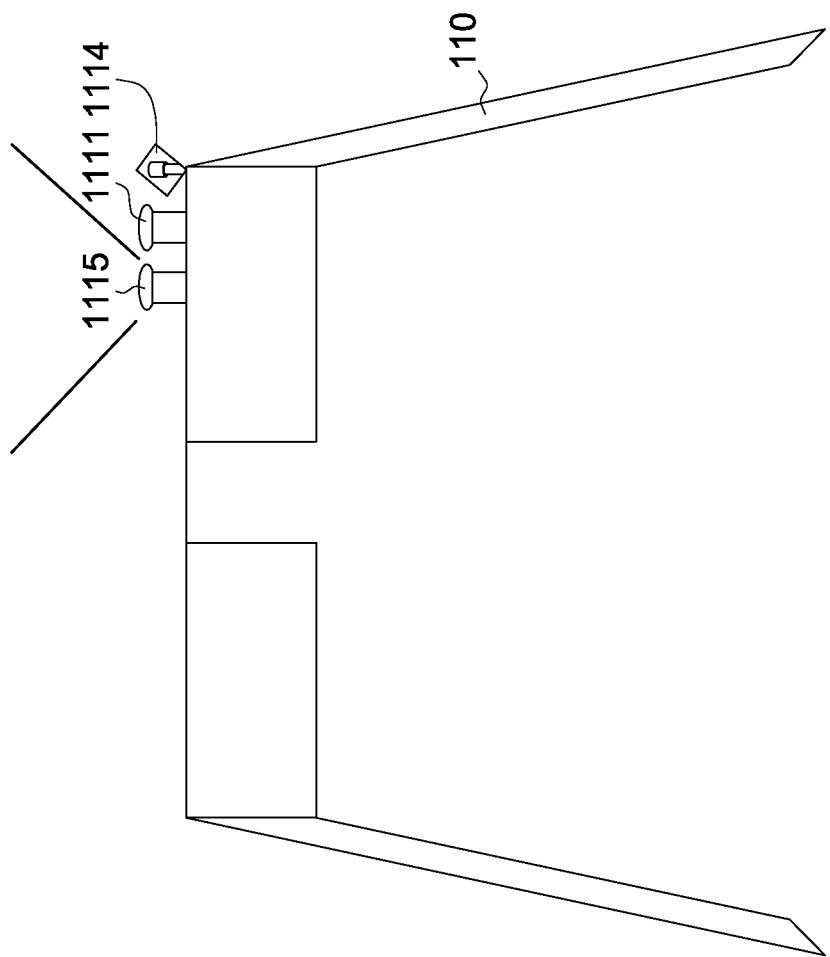
FIG. 9 is an appearance diagram of a head mounted display according to a third embodiment.

Refer to FIG. 8 and FIG. 9 at the same time. FIG. 8 is a block diagram of a head mounted display according to a third embodiment. FIG. 9 is an appearance diagram of a head mounted display according to a third embodiment. The third embodiment is different from the first embodiment mainly in that the head mounted display of FIG. 8 is exemplified by a head mounted display 1c, and the sensing apparatus is exemplified by a sensing apparatus 111c comprising a first image sensor 1111, a structured light camera 1115 and a third infrared LED 1114. The ASIC 106 controls the third infrared LED 1114 to generate a structured light. The ASIC 106 obtains a depth value of the touch object according to the image sensed by the structured light camera 1115. The ASIC 106 can obtain a planar coordinate of the touch object according to the image captured by the first image sensor 1111. A 3D coordinate of the touch object can be obtained and used as a real image coordinate according to the planar coordinate of the touch object and the depth value. The structured light can be realized by such as a spot light, a stripe light or a pattern light. If the structured light is a spot light, the ASIC 106 can obtain a depth value of the touch object from the density of light spots.

Fourth Embodiment

Figure 10:
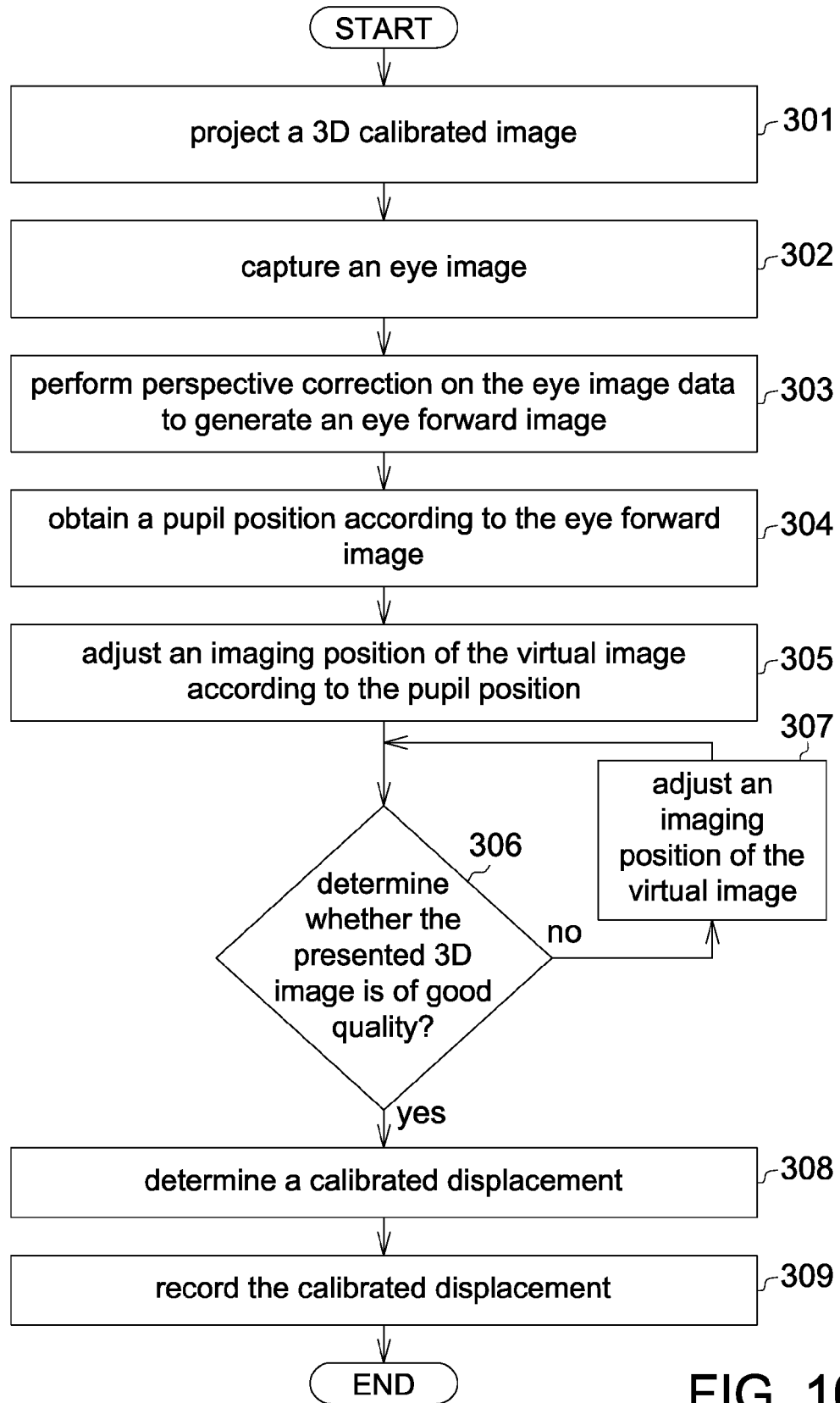
FIG. 10 is flowchart of performing initial 3D calibration on a head mounted display.

Refer to FIG. 1 and FIG. 10 at the same time. FIG. 10 is flowchart of performing initial 3D calibration on a head mounted display. The fourth embodiment is different from the first embodiment mainly in that in the fourth embodiment calibration is performed according to the user's actual feeling to provide best 3D visual effect. Firstly, the process begins at step 301, the application processor 103 controls the pico projector unit 102 to project a 3D calibrated image, such as a cube. The application processor 103 correspondingly sends a message to notify the user to look straight ahead. Meanwhile, the pupil position will be located at the center of the eye. Next, the process proceeds to step 302, the eye image sensing unit 104 captures the user's eye image data such as the user's two eye image.

Then, the process proceeds to step 303, the ASIC 106 performs perspective correction on the eye image data to generate an eye forward image. Then, the process proceeds to step 304, the ASIC 10 obtains a pupil position according to the eye forward image. Then, the process proceeds to step 305, the ASIC 106 controls the adjustment unit 105 to adjust an imaging position of the virtual image according to the pupil position. The adjustment unit 105 adjusts an imaging position of the virtual image, such that the beam position of the pico projector unit 102 matches the pupil position. That is, the adjustment unit 105 is controlled to adjust an imaging position of the virtual image until the beam of the pico projector unit 102 is precisely projected to the pupil position.

Then, the process proceeds to step 306, the ASIC 106 requests the application processor 103 to send an inquiry message to inquire the user whether the presented 3D image is of good quality. If the presented 3D image is not of good quality, then the process proceeds to step 307. In step 307, the ASIC 106 controls the adjustment unit 105 to adjust an imaging position of the virtual image. The adjustment unit 105 can adjust the imaging position of the virtual image by adjusting the beam splitter unit 101 or the pico projector unit 102. Then, step 306 is performed again, the ASIC 106 requests the application processor 103 to send an inquiry message to inquire the user whether the presented 3D image is of good quality. If the presented 3D image is of good quality, then the process proceeds to step 308. In step 308, the ASIC 106 determines a calibrated displacement. If the adjustment unit 105 adjusts the beam splitter unit 101, then the ASIC 106 determines the calibrated displacement according to the adjusted beam splitter unit 101. If the adjustment unit 105 adjusts the pico projector unit 102, then the ASIC 106 determines the calibrated displacement according to the adjusted pico projector unit 102. Then, the process proceeds to step 309, the application processor 103 records the calibrated displacement. Thus, when the user again uses the head mounted display 1, the ASIC 106 can control the adjustment unit to adjust an imaging position of the virtual image according to the calibrated displacement to achieve 3D stereo effect.

The user can obtain several sets of calibrated displacements by using the disclosed initial 3D calibration. For instance, by using the disclosed initial 3D calibration, one set of calibrated displacement can be obtained for a user wearing myopic lenses and another set of calibrated displacement can be obtained for another user not wearing myopic lenses.

Fifth Embodiment

Figure 17:
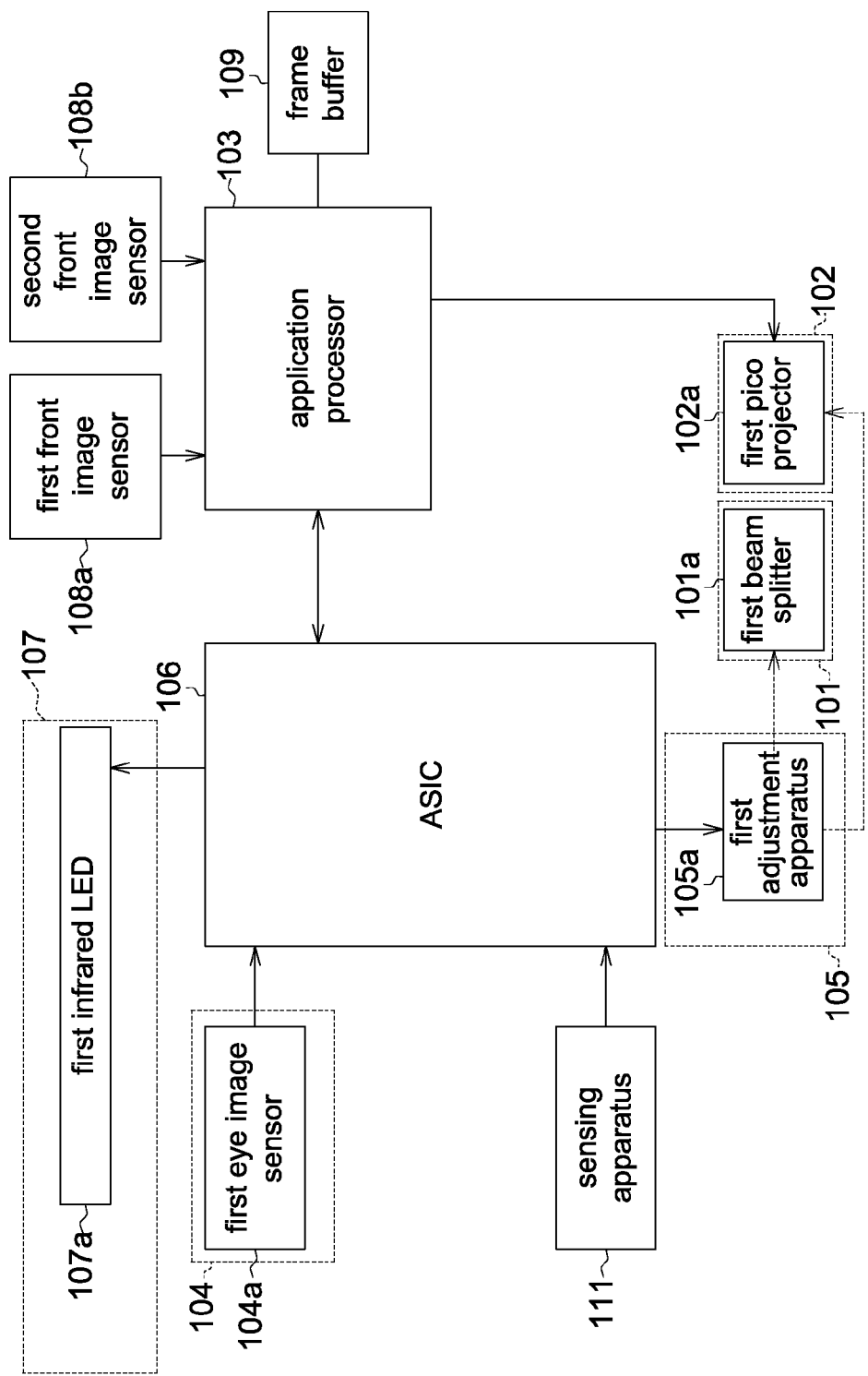
FIG. 17 is a block diagram of a head mounted display according to a fifth embodiment.
Figure 20:
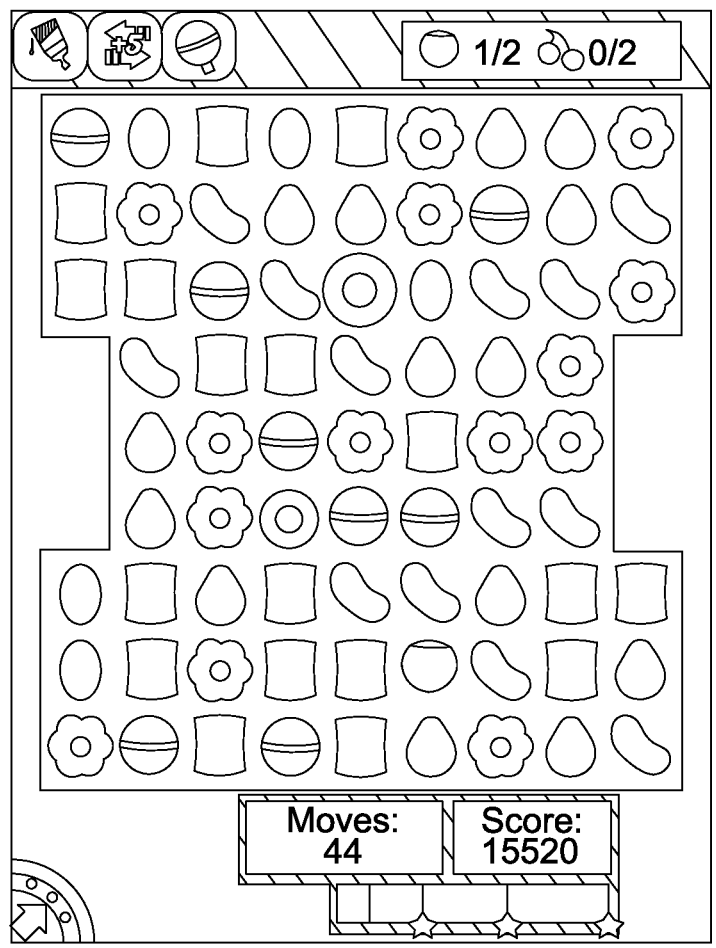
FIG. 20 is a schematic diagram of a computer game.

Refer to FIG. 1, FIG. 17 and FIG. 20 at the same time. FIG. 17 is a block diagram of a head mounted display according to a fifth embodiment. FIG. 20 is a schematic diagram of a computer game. The head mounted display 4 of the fifth embodiment is different from the head mounted display 1 of the first embodiment mainly in that in the fifth embodiment, the eye image sensing unit 104 only comprises a first eye image sensor 104a, the infrared light emitting unit 107 only comprises a first infrared LED 107a, the beam splitter unit 101 only comprises a first beam splitter 101a, the pico projector unit 102 only comprises a first pico projector 102a, the adjustment unit 105 only comprises a first adjustment apparatus 105a, and when the pupil position changes, the virtual image coordinate will change correspondingly. The ASIC 106 estimates a corresponding change in the virtual image coordinate according to the displacement of the pupil position. The user can control a 2D computer game by using the head mounted display 4 as indicated in FIG. 20.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A head mounted display, comprising:
a pico projector unit;
an application processor for controlling the pico projector unit to project a virtual image having a virtual object located on a virtual image coordinate in a virtual image coordinate system;
an eye image sensing unit for capturing eye image data;
an adjustment unit;
a sensing apparatus for sensing a touch object to output sensing data;
an application specific integrated circuit (ASIC) for obtaining a real coordinate of the touch object in a real image coordinate system according to the sensing data, wherein the ASIC obtains a pupil position according to the eye image data, controls the adjustment unit to adjust an imaging position of the virtual image according to the pupil position, and determines whether the touch object touched the virtual object according to the pupil position, the real coordinate and the virtual coordinate; and
an eyeglass frame supporting the adjustment unit, the pico projector unit, the application processor, the eye image sensing unit, the sensing apparatus and the ASIC,
wherein, when the pupil position is located at the center of the eye, the ASIC converts the real coordinate into a first relative coordinate in the virtual coordinate system, and determines whether the first relative coordinate matches the virtual image coordinate, and the ASIC determines that the touch object touched the virtual object if the first relative coordinate matches the virtual image coordinate, and
when the pupil position is not located at the center of the eye, the ASIC keeps the virtual coordinate unchanged, and correspondingly converts the real coordinate into a second relative coordinate, which differs with the first relative coordinate by a touch displacement, in the virtual coordinate system, and the ASIC determines whether the second relative coordinate matches the virtual image coordinate and determines that the touch object touched the virtual object if the second relative coordinate matches the virtual image coordinate.

2. The head mounted display according to claim 1, further comprising a beam splitter unit, wherein the application processor controls the pico projector unit to project a 3D calibrated image, the ASIC controls the adjustment unit to adjust an imaging position of the virtual image according to the pupil position such that a beam position of the pico projector unit matches the pupil position, the ASIC requests the application processor to send an inquiry message to inquire whether the presented 3D image is of good quality, the ASIC controls the adjustment unit to adjust an imaging position of the virtual image if the presented 3D image is not of good quality, and the ASIC decides and records a calibrated displacement according to the adjusted beam splitter unit if the presented 3D image is of good quality.

3. The head mounted display according to claim 1, wherein the application processor records a moveable range of the pupil position.

4. The head mounted display according to claim 1, wherein the sensing apparatus comprises a first image sensor and a second image sensor.

5. The head mounted display according to claim 4, wherein the first image sensor and the second image sensor comprise wide angle lens.

6. The head mounted display according to claim 1, wherein the sensing apparatus comprises a first image sensor and a time of flight (TOF) camera.

7. The head mounted display according to claim 1, wherein the sensing apparatus comprises a first image sensor and a structured light camera.

8. The head mounted display according to claim 1, further comprising:
an infrared light emitting unit for providing an auxiliary light source required by the eye image sensing unit.

9. The head mounted display according to claim 8, further comprising a beam splitter unit comprising a first beam splitter, wherein the pico projector unit comprises a first pico projector, the eye image sensing unit comprises a first eye image sensor, the adjustment unit comprises a first adjustment apparatus, the infrared light emitting unit comprises a first infrared LED, the first pico projector projects the virtual image, the first eye image sensor captures the eye image data, the first adjustment apparatus adjusts the first beam splitter, and the first infrared LED provides an auxiliary light source required by the first eye image sensor.

10. The head mounted display according to claim 8, wherein the pico projector unit comprises a first pico projector, the eye image sensing unit comprises a first eye image sensor, the adjustment unit comprises a first adjustment apparatus, the infrared light emitting unit comprises a first infrared LED, the first pico projector projects the virtual image, the first eye image sensor captures the eye image data, the first adjustment apparatus adjusts the first pico projector, and the first infrared LED provides an auxiliary light source required by the first eye image sensor.

11. The head mounted display according to claim 8, further comprising a beam splitter unit comprising a first beam splitter and a second beam splitter, wherein the pico projector unit comprises a first pico projector and a second pico projector, the eye image sensing unit comprises a first eye image sensor and a second eye image sensor, the adjustment unit comprises a first adjustment apparatus and a second adjustment apparatus, the infrared light emitting unit comprises a first infrared LED and a second infrared LED, the first pico projector and the second pico projector project the virtual image, the first eye image sensor and the second eye image sensor capture the eye image data, the first adjustment apparatus adjusts the first beam splitter, the second adjustment apparatus adjusts the second beam splitter, the first infrared LED provides an auxiliary light source required by the first eye image sensor, and the second infrared LED provides an auxiliary light source required by the second eye image sensor.

12. A control method of a head mounted display, comprising:
controlling a pico projector unit to project a virtual image having a virtual object located on a virtual image coordinate in a virtual image coordinate system;
capturing eye image data by an eye image sensing unit;
sensing a touch object by a sensing apparatus to output sensing data;
obtaining a real coordinate of the touch object in a real image coordinate system according to the sensing data;
obtaining a pupil position according to the eye image data, and controlling an adjustment unit to adjust an imaging position of the virtual image according to the pupil position; and
determining whether the touch object touched the virtual object according to the pupil position, the real coordinate and the virtual coordinate,
wherein in the determination step, when the pupil position is located at the center of the eye, the real coordinate is converted into a first relative coordinate in the virtual coordinate system, and whether the first relative coordinate matches the virtual image coordinate is determined, and it is determined that the touch object touched the virtual object if the first relative coordinate matches the virtual image coordinate, and
when the pupil position is not located at the center of the eye, the virtual coordinate is kept unchanged, and the real coordinate is correspondingly converted into a second relative coordinate, which differs with the first relative coordinate by a touch displacement, in the virtual coordinate system, whether the second relative coordinate matches the virtual image coordinate is determined, and it is determined that the touch object touched the virtual object if the second relative coordinate matches the virtual image coordinate.

13. The control method according to claim 12, further comprising:
projecting a 3D calibrated image;
controlling the adjustment unit to adjust an imaging position of the virtual image according to the pupil position, such that a beam position of the pico projector unit matches the pupil position;
sending an inquiry message to inquire whether the presented 3D image is of good quality;
adjusting an imaging position of the virtual image if the presented 3D image is not of good quality; and
determining and recording a calibrated displacement according to the adjusted beam splitter unit if the presented 3D image is of good quality.

14. The control method according to claim 12, further comprising:
recording a moveable range of the pupil position.

15. The control method according to claim 12, wherein the sensing apparatus comprises a first image sensor and a second image sensor.

16. The control method according to claim 15, wherein the first image sensor and the second image sensor comprise wide angle lens.

17. The control method according to claim 12, wherein the sensing apparatus comprises a first image sensor and a time of flight (TOF) camera.

18. The control method according to claim 12, wherein the sensing apparatus comprises a first image sensor and a structured light camera.

19. The control method according to claim 12, wherein the head mounted display further comprises:
an infrared light emitting unit for providing an auxiliary light source required by the eye image sensing unit.

20. The control method according to claim 19, wherein the head mounted display further comprises a beam splitter unit comprising a first beam splitter, the pico projector unit comprises a first pico projector, the eye image sensing unit comprises a first eye image sensor, the adjustment unit comprises a first adjustment apparatus, the infrared light emitting unit comprises a first infrared LED, the first pico projector projects the virtual image, the first eye image sensor captures the eye image data, the first adjustment apparatus adjusts the first beam splitter, and the first infrared LED provides an auxiliary light source required by the first eye image sensor.

21. The control method according to claim 19, wherein the pico projector unit comprises a first pico projector, the eye image sensing unit comprises a first eye image sensor, the adjustment unit comprises a first adjustment apparatus, the infrared light emitting unit comprises a first infrared LED, the first pico projector projects the virtual image, the first eye image sensor captures the eye image data, the first adjustment apparatus adjusts the first pico projector, and the first infrared LED provides an auxiliary light source required by the first eye image sensor.

22. The control method according to claim 19, wherein the head mounted display further comprises a beam splitter unit comprising a first beam splitter and a second beam splitter, the pico projector unit comprises a first pico projector and a second pico projector, the eye image sensing unit comprises a first eye image sensor and a second eye image sensor, the adjustment unit comprises a first adjustment apparatus and a second adjustment apparatus, the infrared light emitting unit comprises a first infrared LED and a second infrared LED, the first pico projector and the second pico projector project the virtual image, the first eye image sensor and the second eye image sensor capture the eye image data, the first adjustment apparatus adjusts the first beam splitter, the second adjustment apparatus adjusts the second beam splitter, the first infrared LED provides an auxiliary light source required by the first eye image sensor, and the second infrared LED provides an auxiliary light source required by the second eye image sensor.

* * * * *